(12) United States Patent
Hargis

(10) Patent No.: US 9,024,557 B2
(45) Date of Patent: May 5, 2015

(54) VARIABLE SWITCHING FREQUENCY POWER CONVERTER

(71) Applicant: Control Techniques Ltd, Newton (GB)

(72) Inventor: Colin Hargis, Oswestry (GB)

(73) Assignee: Control Techniques Ltd, Newtown (GB)

( * ) Notice: Subject to any disclaimer, the term of this patent is extended or adjusted under 35 U.S.C. 154(b) by 193 days.

(21) Appl. No.: 13/716,877

(22) Filed: Dec. 17, 2012

(65) Prior Publication Data

US 2013/0154530 A1 Jun. 20, 2013

(30) Foreign Application Priority Data

Dec. 16, 2011 (GB) .................................. 1121800.5

(51) Int. Cl.
*H02P 6/14* (2006.01)
*H02P 27/06* (2006.01)
*H02P 27/08* (2006.01)

(52) U.S. Cl.
CPC ............ *H02P 27/06* (2013.01); *H02P 2201/00* (2013.01); *H02P 27/08* (2013.01); *H02P 2205/05* (2013.01)

(58) Field of Classification Search
USPC ............... 318/400.26, 400.11, 430, 431, 432, 318/433, 434
See application file for complete search history.

(56) References Cited

U.S. PATENT DOCUMENTS 8,606,425 B2 * 12/2013 Morishima et al. ........... 700/298
2008/0016780 A1 1/2008 McDougle et al.
2010/0253256 A1 * 10/2010 Doktar et al. ............ 318/400.11

FOREIGN PATENT DOCUMENTS

WO 2004/055961 7/2004

\* cited by examiner

*Primary Examiner* — Karen Masih
(74) *Attorney, Agent, or Firm* — Harness, Dickey & Pierce, P.L.C.

(57) ABSTRACT

A drive system for an electrical load such as an electric motor or generator comprises a PWM converter and a controller therefore. A signal indicative of a condition of the converter outpost is used in a controller to drive an optimal value of PWM switching frequency based on a load characteristic that is used to control the pulse switching frequency. The system takes account of the overall system in deriving an efficient PWM switching frequency.

15 Claims, 1 Drawing Sheet

VARIABLE SWITCHING FREQUENCY POWER CONVERTER

CROSS-REFERENCE TO RELATED APPLICATION

This application claims the benefit and priority of Great Britain Application No. GB 1121800.5 filed Dec. 16, 2011. The entire disclosure of the above application is incorporated herein by reference.

This invention relates to a power conversion system for an electrical load such as a photovoltaic or wind powered energy conversion system, or other electrical load such as an electric motor.

In the generation of electrical power from, for example, a photovoltaic or wind energy source, the supplied electricity is fed into the grid via a power conversion inverter such as a grid-tie inverter which converts the d.c. electrical power into a.c. at the appropriate voltage and frequency. In the control of an electrical motor, a motor drive inverter is used to regulate the voltage and frequency of the supply to the motor according to the demand. An inverter is typically a solid state switched inverter that regulates its output by means of pulse width modulation (PWM). In the case of a power conversion inverter, the pulsed output is changed to a predominantly sinusoidal waveshape by the use of an electrical filter containing a substantial inductive element. In the case of a motor or other electrical machine, there is an inherent inductance of the machine which is usually sufficient to carry out this function in itself.

Thus, electrical machines, whether motoring or generating electricity, may similarly use a conversion system to interface with the electrical system to which they are connected. Generically, the device for regulating the supply of electrical power either from a generating source into a power network or regulating the supply of electrical power to control an electrical machine is referred to herein as a power converter.

For a power conversion inverter, the efficiency of the inverter itself is typically in the region of 98%, and that of the filter 99%. In the market for such systems the efficiency is a crucial competitive factor, because it affects, for example, the energy yield from the given energy source. Efficiency improvements as small as 0.2% can be decisive in competition.

For a motor drive inverter, the efficiency of the inverter itself is also typically in the region of 98%, but the efficiency of the associated motor may vary in the range of about 80% to 95% depending on its power rating and details of its design. Typically the industrial market for drive systems is serviced, on the one hand, by manufacturers of electrical machines and, on the other hand, by the manufacturers of the inverters. Manufacturers of motor drive inverters compete with each other to produce a product that is "feature rich" in terms of their flexibility and suitability at performing the task, and may also compete on the efficiency of the converter. Thus, the selling point based on efficiency is often marginal as the losses are small with respect to their throughput and to the losses in the motor.

The efficiency of the inverter can be optimised by adjusting the frequency of the PWM. An inverter using pulse width modulation incurs losses based on the frequency of the switching events. Generally, the best efficiency of the inverter when taken alone at a high load current is given with a low switching frequency. This is because the semiconductor switching losses in the inverter dominate. Contrary factors in choosing the switching frequency may be acoustic noise and quality of dynamic control, which are improved by a higher switching frequency.

For the machine or for the filter connected to the inverter, there is an additional loss caused by the magnetic flux ripple from the inverter PWM. This additional loss can often be reduced by using a higher switching frequency.

Commercially, a power converter for controlling an electrical load, such as a motor or the output of a power generation device, is designed to drive an unspecified load device. The practical approach is to match an off-the-shelf converter to an off-the-shelf electrical load for a best fit at a notional operating point.

Some motor drive inverters are designed with a switching frequency which is selectable. Alternatively, they may have a frequency which adapts to the inverter operating condition based on, for example, the temperature of a temperature-sensitive part of the inverter. Adjustment of the switching frequency in known inverters is only adaptive to the condition of the inverter.

The disclosed embodiments provide a drive system for an electrical load, comprising an electrical device, a converter having a pulse modulated output, a controller operably connected to control the output of the converter; and means for deriving a signal indicative of a component of the output from the converter, the controller being operable to derive an optimal value of pulse switching frequency of the inverter for the system based on a load characteristic and the derived signal; and being operable to control the pulse switching frequency in accordance with the optimal value.

The efficiency of the complete system, e.g. the power conversion inverter with its filter, or the inverter with its motor or machine, is a function of the losses in both the inverter and the filter or the inverter and the machine. For a particular system at a particular loading it has been recognised that there generally exists a switching frequency which optimises the overall efficiency of the system.

In order to optimise the efficiency of a motor drive or a power conversion inverter, the switching frequency is adapted according to a look-up table, a mathematical expression or a numerical rule chosen so as to optimise the overall efficiency of the combination of the drive or inverter and the load. The optimal efficiency is found by adapting the switching frequency to the load current or to some other suitable parameter related to the current. The disclosed embodiments herein utilise the behaviour of the system as a whole to optimise the efficiency.

Embodiments will now be described by way of example with reference to the accompanying drawings in which.

Figure 1:
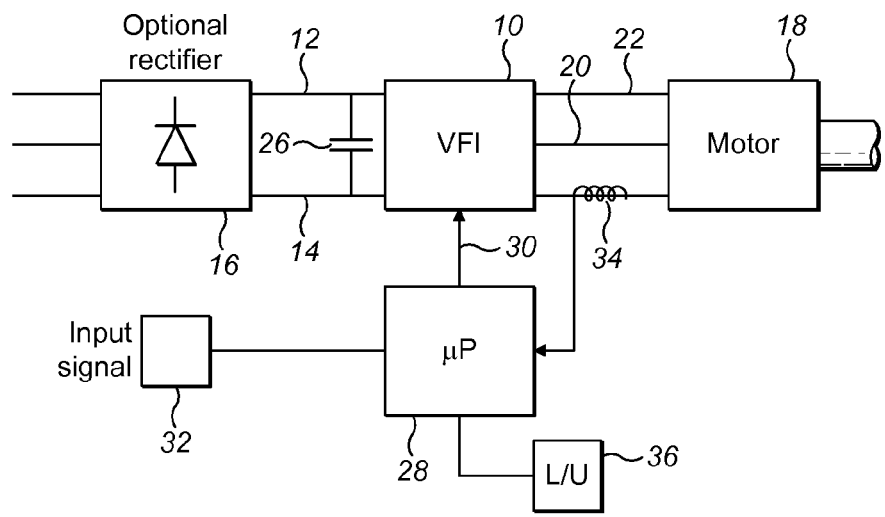
FIG. 1 is a schematic block diagram of a motor control system.

Referring to FIG. 1, a motor control system comprises a variable frequency inverter (VFI) 10 which has a supply input on lines 12 and 14 of d.c. supply voltage. The inverter 10 is fed with rectifier 3-phase a.c. power via a rectifier 16. The inverter 10 may be fed directly with d.c. power. The output of the VFI 10 is provided to the power input of an a.c. induction motor 18 on power lines 20, 22, 24. DC link capacitor 26 is connected across the d.c. power lines 12 and 14 supplying the inverter 10.

The VFI 10 is controlled by a processor-based controller 28 over signal line 30. The demand on the motor 18 is set by an input device 32. The input device 32 may be a part of another controller system of which the motor is a part, such as a feedback system, or is a user input device such as a control input.

In this embodiment the controller 28 has at least one current transducer 34 arranged in at least one of the motor lines 20-24. This provides a signal which is indicative of the motor load current.

The controller may have the facility to analyse the measured current into derived current components related to the voltage, typically the torque-producing component and the magnetising component of the current.

The controller 28 has a look-up table 36. This table 36 may be located in the processor memory or may be a self-contained module. The look-up table 36 is loaded with coordinates of motor load current, or a derived value associated with it such as the torque-producing current, together with other optional parameters such as the motor power frequency or motor speed, and gives the VFI output switching frequency for each value of load current or combination of conditions, for optimal efficiency. Generally the motor current is often the useful input parameter because the inverter switching losses are primarily a function of the current magnitude regardless of its phase angle. However in some cases, as determined by the results of suitable tests, it may be found that the torque-producing current is a more useful parameter.

As indicated, a d.c. supply is converted into a switched output ac power supply at a frequency suitable for the motor and at a variable current magnitude to drive the motor according to a desired speed at a given load. In this embodiment, the switching frequency is arranged to optimise the efficiency of the overall system for a given motor characteristic, as a function of the variable that is indicative of the motor current or torque producing current which is directly associated with the inverter loading.

The values of switching frequency for values of load current in the lookup table can be derived in various ways. Firstly, the switching frequency values can be derived from tests or calculations carried out on a notional standard class or type of motor of a given size. This is particularly applicable to the use of the drive with motors meeting standardised efficiency classes according to the international standard IEC 60034-30:2009, whose use in the European Union is mandated under Commission Regulation (EC) No 640/2009. It may alternatively be applied for other widely used standard "target motors". Alternatively, an individual motor, or type of motor, can be characterised under laboratory test conditions and the desired values used in the look-up table. The skilled person will be aware of the procedure for characterising a motor and is not explained in further detail here.

The demand input 32 creates a control output from the processor-based controller 28 that is applied to the VFI 10 to cause an output drive voltage at a switching frequency designated by the look-up table to the controller. The derived signal is directly related to the previously determined efficiency of the output of the drive and the load. The characteristic of the machine provides information on the efficiency of the load at a given set of operating conditions. By utilising these parameters the system can use information on the overall system to determine the optimal switching frequency of the complete motor-inverter system at a given load. The system monitors the variables that enable the overall efficiency of the system to be maintained.

Figure 2:
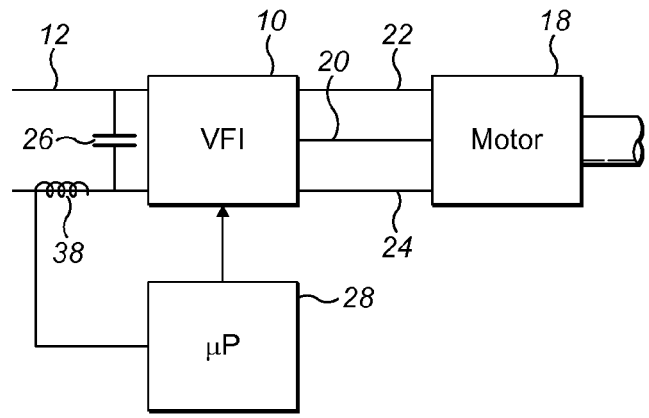
FIG. 2 is a schematic block diagram of an alternative motor control system.

FIG. 2 is an alternative to FIG. 1 in which the current transducer 34 is replaced by a current transducer 38 which is arranged in the supply line to the VFI. The output signal of this transducer is then indicative of the load torque-producing current.

In all the above examples the switching frequency of the VFI is arranged to be a function of a suitable variable which indicates the relevant torque producing current of the load. The relevant variable is most typically the inverter a.c. output current but however, it is equally well derived from other variables. For example, where the motor has a low power factor, and the current is not particularly sensitive to the motor power, an alternative variable such as the d.c. current can be used. Instead of a look-up table the function may be defined in the form of a mathematical or algorithmic expression such as a polynomial or a series of logical comparisons. For an inverter drive, the function is arranged to optimise the efficiency of the complete drive system when using a particular target motor, which might be a characterised actual motor or a standardised motor such as will be used in the future for defining any new drive efficiency grades. In an electric motor it shows above that the information on the current or the torque producing current can be derived from various sources. The disclosed embodiments take into account the overall losses in the system, as opposed to just optimising the inverter itself.

In all of the cases discussed above, the inverter control system may also adapt the switching frequency for reasons related to its own operation, for example to avoid excessive inverter temperature rise or to accommodate a high load level or a high ambient temperature. The system efficiency optimisation function is arranged to choose the most suitable switching frequency subject to any other system constraints, which would take a higher priority where necessary.

Figure 3:
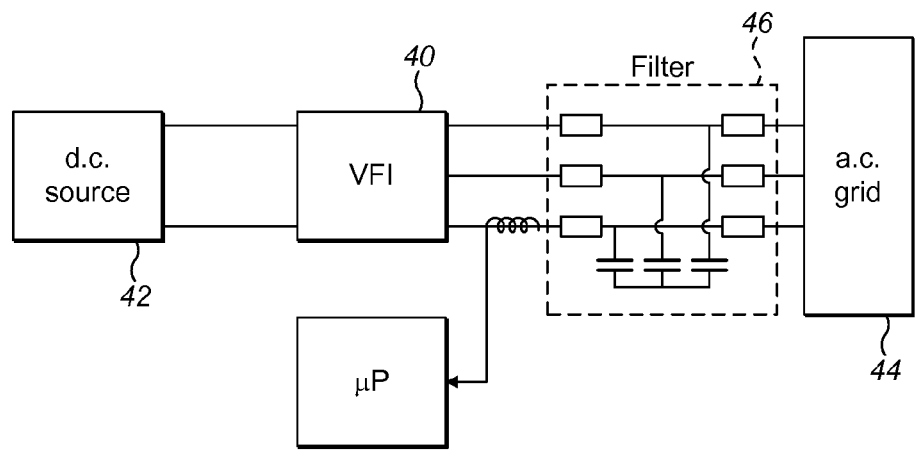
FIG. 3 is a schematic block diagram of an energy converter control system.

FIG. 3 is a schematic block diagram of a VFI power converter 40 for connecting a d.c. source 42 such as a photovoltaic array to an a.c. network or power grid 44. It comprises the variable frequency inverter arranged to be synchronised to the power grid, and a filter 46 which prevents excessive ripple current from the inverter PWM from flowing into the network. In some cases an output transformer might be included (not shown). The inverter output current is measured and made available to the inverter controller for a variety of purposes related to its control, but an additional purpose is to carry out the process of optimisation of the inverter switching frequency according to the current.

For a power inverter controlling the output of a power generation system such as a photovoltaic or wind powered generation system, the function is arranged to optimise the efficiency of the complete inverter including its intended output inductance and filter and any output transformer as applicable. In the case of electrical power generation, the overall system comprises an output inductance or filter connected to the a.c. power grid or load, in place of the electric motor as the load. Improved efficiency is gained by taking account of the operating conditions of the complete inverter system, especially at part load. This is because the present system sets the switching frequency at a low value in order to optimise full load efficiency (minimise full load loss). However this switching frequency is commonly not the optimum one at part load, where the fixed loss in the filter caused by switching is more significant than the inverter loss. In grid-tie inverters used in systems such as PV and other renewables where the power throughput is highly variable, the published efficiency according to standards such as EN 50530:2010 and the California Energy Commission inverter test protocols, is currently a weighted average of efficiencies at various loads. The part-load efficiency has a major effect on the declared value so that making the switching frequency adapt to load can allow the published and effective efficiency to be considerably improved.

The invention claimed is:

1. A power converter system, comprising:
   an electrical load,
   a power converter having a variable frequency output connected to the load, the variable frequency output being generated by pulse width modulation at a switching frequency,
   a controller operably connected to control the output of the power converter,
   means for producing a signal indicative of a load current,
   means for deriving a value of switching frequency of the power converter based on an expression of a characteristic of the load and the signal, and
   means for setting the switching frequency of the power converter according to the value.

2. A system as claimed in claim 1 in which the means for deriving include a look-up table.

3. A system as claimed in claim 1 in which the means for deriving include means for running an algorithm.

4. A system as claimed in claim 1 in which the means for deriving include means for running a mathematical expression.

5. A system as claimed in claim 1 in which the means for producing a signal include a current transducer arranged in relation to the output of the power converter.

6. A system as claimed in claim 1 in which the means for producing a signal include a current transducer arranged in relation to a supply to the power converter.

7. A system as claimed in claim 1 in which the power converter produces an a.c. power output from a d.c. power input.

8. A system as claimed in claim 1 in which the load is an electrical machine producing a mechanical output from an electrical power input.

9. A system as claimed in claim 1 in which the load is an electrical power network and the power converter is supplied by a renewable energy source.

10. A system as claimed in claim 1 in which means for setting are operable to set the switching frequency to optimise the efficiency of the system.

11. A method of power conversion from a power converter having a variable frequency output connected to an electrical load, the variable frequency output being generated by pulse width modulation at a switching frequency, the method comprising:
    producing a signal indicative of a load current,
    deriving a value of switching frequency of the power converter based on an expression of a characteristic of the load and the signal, and
    setting the switching frequency of the power converter according to the value.

12. A system as claimed in claim 4 wherein the mathematical expression is a polynomial expression.

13. A system as claimed in claim 8 wherein the electrical machine is an electric motor.

14. A system as claimed in claim 13 wherein the electric motor is an a.c. induction motor.

15. A system as claimed in claim 9, wherein the renewable energy source is a photovoltaic cell or a wind power generator.

* * * * *